United States Patent
Hattori (10) Patent No.: US 7,167,780 B2
(45) Date of Patent: Jan. 23, 2007

(54) REMOTE CONTROL COMMUNICATION SYSTEM AND TRANSMITTING AND RECEIVING APPARATUSES

(75) Inventor: Takayuki Hattori, Obu (JP)

(73) Assignee: Denso Corporation, Kariya (JP)

( * ) Notice: Subject to any disclaimer, the term of this patent is extended or adjusted under 35 U.S.C. 154(b) by 547 days.

(21) Appl. No.: 10/759,118

(22) Filed: Jan. 20, 2004

(65) Prior Publication Data

US 2004/0236479 A1   Nov. 25, 2004

(30) Foreign Application Priority Data

Feb. 7, 2003   (JP) ............................ 2003-031475

(51) Int. Cl.
  *G05D 1/00*   (2006.01)
(52) U.S. Cl. ............................ 701/2; 701/36; 307/10.6; 340/426.17
(58) Field of Classification Search ................ 701/2, 701/34, 36, 113; 340/426.13, 426.17; 307/10.2, 307/10.3, 10.4, 10.6; 180/270
  See application file for complete search history.

(56) References Cited

U.S. PATENT DOCUMENTS

| | | | |
|---|---|---|---|
| 6,647,328 B2 * | 11/2003 | Walker | 701/36 |
| 6,789,003 B2 * | 9/2004 | Magner et al. | 701/2 |
| 6,963,794 B2 * | 11/2005 | Geber et al. | 701/2 |
| 7,031,826 B2 * | 4/2006 | Flick | 701/113 |
| 7,069,119 B2 * | 6/2006 | Ueda et al. | 701/2 |

FOREIGN PATENT DOCUMENTS

JP   A-2001-355363   12/2001

* cited by examiner

Primary Examiner—Richard M. Camby
(74) Attorney, Agent, or Firm—Posz Law Group, PLC (57) ABSTRACT

In a remote control communication system, a transmitting apparatus transmits operation information, which includes switch information indicating the type of the switch and operation duration information, to a receiving apparatus in a vehicle. If another operation is again carried out on any operation switch, the transmitting apparatus transmits present operation information with the operation information transmitted previously. A receiving apparatus transmits the operation information and reception duration information to a control apparatus in the vehicle. Similarly, if other operation information is received again, the receiving apparatus transmits the other operation information with the previous operation information.

12 Claims, 6 Drawing Sheets

NONE: AT INITIAL OPERATION

FIG. 4B

PRESENT RECEPTION

NONE: AT INITIAL RECEPTION

REMOTE CONTROL COMMUNICATION SYSTEM AND TRANSMITTING AND RECEIVING APPARATUSES

CROSS REFERENCE TO RELATED APPLICATION

This application relates to and incorporates herein by reference Japanese Patent Application No. 2003-31475 filed on Feb. 7, 2003.

FIELD OF THE INVENTION

The present invention relates to a vehicle remote control communication system comprising a portable transmitting apparatus, which has operation switches for remotely controlling components of a vehicle, and a receiving apparatus mounted on the vehicle. The present invention also relates to transmission and receiving apparatuses composing the vehicle remote control communication system.

BACKGROUND OF THE INVENTION

A conventional communication system for a vehicle is capable of executing various kinds of remote control carried out from a location outside a vehicle. Typically, the control is executed to lock and unlock doors of the vehicle, open and retract door mirrors of the vehicle, open and close power windows of the vehicle, open and close slide and back doors of the vehicle as well as start and stop the engine of the vehicle.

This communication system comprises a portable transmitting apparatus, which has a plurality of operation switches, and a receiving apparatus mounted on the vehicle. When a user carrying the transmitting apparatus operates a predetermined operation switch, the transmitting apparatus transmits operation information corresponding to the operated operation switch as a radio wave. The operation information indicates the type of the operated operation switch. Receiving the radio wave, the receiving apparatus mounted on the vehicle supplies the operation information conveyed by the radio wave to a control apparatus employed in the vehicle.

In a typical configuration of the communication system of this type, the transmitting apparatus transmits operation information as a radio wave only if the user operates an operation switch provided on the transmitting apparatus. To have the transmitted radio wave reach the receiving apparatus mounted on a vehicle with a high degree of reliability, the user must operate the operation switch at a location sufficiently close to the vehicle. Therefore, the communication system cannot be used with a high degree of convenience.

For this reason, a communication system disclosed in JP-A-2001-355363 is proposed. In this proposed communication system, if the user operates an operation switch, the transmitting apparatus thereafter continues transmission of operation information for a predetermined period of time even if the user stops the operation carried out on the operation switch. In the proposed communication system, however, the time of the transmission of operation information corresponding to an operation switch operated by the user is merely extended. Thus, the content of a command cannot be expressed in terms of the number of switch operations or the operation duration.

In the communication system for remotely controlling a vehicle as described above, with an increasing number of control types each executed as a command issued by a remote control, the user becomes most likely prone to misoperations carried out on operation switches inadvertently as the operations causing incorrect control. Thus, if the number of control types each executed as a command issued by a remote control becomes greater than that of the conventional communication system, the content of a command needs to be expressed not only in terms of the type of an operation switch, but also in terms of the number of switch operations and the operation duration.

In the proposed communication system, however, once an operation switch is operated, the transmitting apparatus thereafter merely continues transmission of operation information for a predetermined period of time. Thus, even through the content of a command can be expressed in terms the type of an operation switch, it cannot be expressed in terms of the number of switch operations and the operation duration.

In addition, to convey the content of a command given to a control apparatus employed in a vehicle not only in terms of the type of an operation switch, but also in terms of the number of switch operations and the operation duration, it is necessary to design the transmitting apparatus into such a configuration that the transmitting apparatus transmits operation information corresponding to an operation switch only if the user operates the operation switch.

In the case of a transmitting apparatus with such a configuration, if only operation information indicating the type of an operated operation switch is transmitted as a radio wave as is the case with the conventional communication system, however, the user must operate the operation switch at a location sufficiently close to a vehicle to have the radio wave transmitted by the transmitting apparatus reach the receiving apparatus mounted on the vehicle with a high degree of reliability. Therefore, the transmitting apparatus with such a configuration cannot be used with a high degree of convenience.

SUMMARY OF THE INVENTION

It is thus an object of the present invention addressing the above drawbacks to provide a capability of propagating an operation command, which is prescribed in terms of the number of times the user operates an operation switch or prescribed in terms of the operation duration of the operation switch, to a receiving apparatus mounted on a vehicle with a high degree of reliability even if the receiving apparatus is not capable of receiving a portion of a signal transmitted by a transmitting apparatus.

When an operation is carried out on any one of a plurality of operation switches employed in a transmitting apparatus of a communication system used in carrying out remote controls of a vehicle, the transmitting apparatus is thereafter transmitting switch information indicating the type of the operated operation switch as operation information conveyed by a radio wave till the operation carried out on the switch is finished. In addition, if an operation is again carried out on any specific one of the operation switches before a predetermined period of time lapses since the end of a preceding switch operation, the transmitting apparatus is thereafter transmitting switch information indicating the type of the specific operation switch operated this time and switch information transmitted at the time of the preceding switch operation as operation information conveyed by a radio wave till the present operation of the specific operation switch is finished.

The receiving apparatus receives the operation information transmitted by the transmitting apparatus and supplies the information to a control apparatus as a command. Thus, an operation command issued by the user can be prevented from being undelivered to the control apparatus due to the fact that the receiving apparatus is not capable of receiving a portion of operation information transmitted by the user from the transmitting apparatus by operating an operation switch a predetermined number of times in the communication system, wherein the content of a command given to the control apparatus is prescribed in terms of the type of an operation switch and the number of operations carried out on the operation switch.

More specifically, when the user start operations of an operation switch while approaching the vehicle, the receiving apparatus may not be capable of receiving operation information transmitted by the transmitting apparatus in the first switch operation carried out by the user due to the fact that the user carries out the first operation at a location too far away from the vehicle, that is, the distance between the transmitting apparatus and the receiving apparatus is too long. However, current operation information transmitted by the transmitting apparatus in a second switch operation carried out by the user includes the operation information transmitted previously by the transmitting apparatus in the first switch operation. Thus, if the receiving apparatus is capable of receiving the current operation information transmitted by the transmitting apparatus in the second switch operation, the control apparatus is capable of detecting the two switch operations carried out by the user on the basis of the current operation information and, hence, capable of executing vehicle control according to the type of the operation switch operated by the user and the number of switch operations carried out on the switch with a high degree of accuracy.

If an operation is carried out on one of a plurality of operation switches employed in a transmitting apparatus of a remote control communication system for remotely controlling a vehicle, the transmitting apparatus is thereafter transmitting switch information indicating the type of the operated operation switch and operation duration information representing a continuous period of time, in which the operation switch is being operated, as operation information conveyed by a radio wave till the switch operation is finished. The receiving apparatus receives the operation information transmitted by the transmitting apparatus and supplies the information to a control apparatus as a command.

Thus, if the content of a command issued to the control apparatus is prescribed in terms of the type of an operation switch and the operation duration of the operation switch, the control apparatus is capable of recognizing the type of the operation switch and the operation duration and, hence, executing control according to a result of recognition even if the receiving apparatus cannot receive all the operation information transmitted by the transmitting apparatus.

More specifically, when the user start an operation of an operation switch while approaching the vehicle, the receiving apparatus may not be capable of receiving some of operation information transmitted by the transmitting apparatus in the switch operations carried out by the user due to the fact that the user operates an operation switch at the beginning of the operation at a location too far away from the vehicle or the distance between the transmitting apparatus and the receiving apparatus is too long. The operation information that is transmitted by the transmitting apparatus before the user stops the operation of the operation switch includes operation duration information indicating a continuous operation duration of the operation switch operated by the user. Thus, if the receiving apparatus is capable of receiving the operation information that is transmitted by the transmitting apparatus before the user stops the operation of the operation switch, the control apparatus is capable of recognizing the operation duration of the operation switch on the basis of the received operation information and, hence, capable of executing vehicle control according to the type of the operation switch operated by the user and the duration of the operation carried out on the operation switch with a high degree of accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
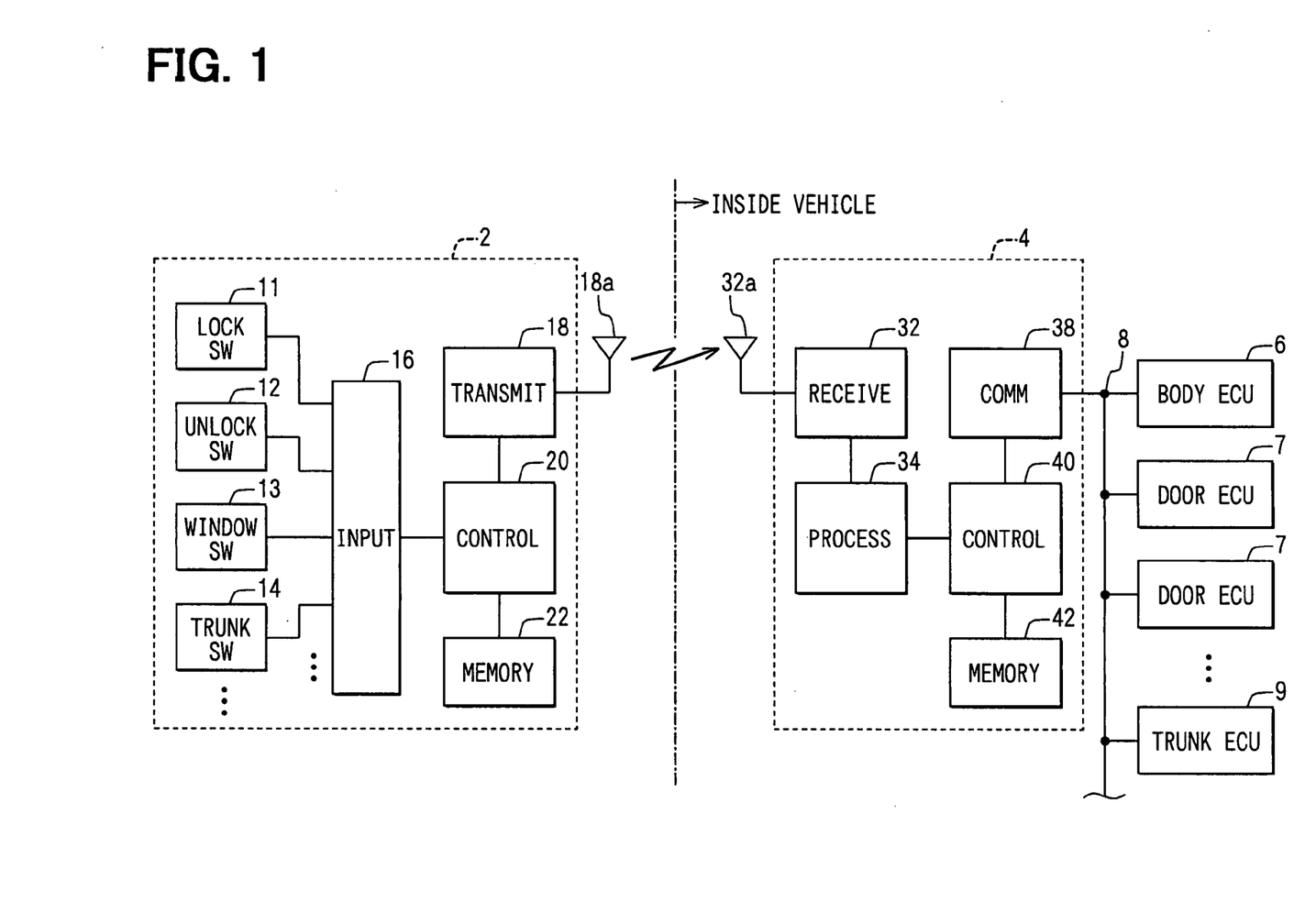
FIG. 1 is a block diagram showing a remote control communication system implemented by an embodiment of the present invention as a system for remotely controlling a vehicle.

Referring first to FIG. 1, a remote control communication system is implemented as a keyless entry system for remotely controlling vehicle doors. This system comprises a portable transmitting apparatus 2 carried by a vehicle owner or user and a receiving apparatus 4 mounted on a vehicle.

At a location separated from the vehicle, the user operates the portable transmitting apparatus 2 to carry out a variety of operations such as an operation to lock and unlock doors, an operation to open and close power windows and an operation to open a trunk room. Thus, the portable transmitting apparatus 2 has a door lock switch 11 for giving a command to lock the doors, a door unlock switch 12 for giving a command to unlock the doors, a power window switch 13 for giving a command to open and close the power windows and a trunk switch 14 for giving a command to open the trunk room.

The portable transmitting apparatus 2 also includes an input processing unit 16, a radio transmitter unit 18, a control unit 20 and a memory unit 22. The input processing unit 16 is a circuit for processing input signals received from the switches 11 to 14 and supplies results of the processing to the other internal circuits employed in the portable transmitting apparatus 2. The radio transmitter unit 18 is a circuit for transmitting operation information, which is generated when the user operates any of the switches 11 to 14, to the receiving apparatus 4 mounted on the vehicle as a radio wave by way of a transmission antenna 18a. The control unit 20 is a microcomputer for identifying the type of an operation switch, which is operated by the user, on the basis of an input signal received from the input processing unit 16, generating operation information and outputting the generated operation information to the transmission antenna 18a by way of the radio transmitter unit 18. The operation information comprises switch information indicating the type of the operation switch and additional information such as an identification code assigned to the portable transmitting apparatus 2 and the duration of a continuous operation carried out on the operation switch. The memory unit 22 is a memory for storing, among other data, operation programs to be executed by the control unit 20 and operation information transmitted from the radio transmitter unit 18 in the past.

The receiving apparatus 4 receives operation information transmitted by the portable transmitting apparatus 2 and supplies the received operation information to a body ECU (electronic control unit) 6 by way of a vehicle internal LAN (local area network) as a control command serving as a remote control command. The body ECU 6 is a control apparatus of a body system of the vehicle. The receiving apparatus 4 comprises a radio receiver unit 32, a reception processing unit 34, a wire communication unit 38, a control unit 40 and a memory unit 42. The radio receiver unit 32 is a circuit for receiving a transmitted radio wave from the portable transmitting apparatus 2 through a reception antenna 18a. The reception processing unit 34 is a circuit for restoring operation information transmitted by the portable transmitting apparatus 2 from a reception signal received by the radio receiver unit 32. The wire communication unit 38 is a component for exchanging data with the body ECU 6 and other control apparatuses mounted on the vehicle. The control unit 40 is a microcomputer for inputting the operation information restored by the reception processing unit 34, converting the operation information into data transmissible through the vehicle internal LAN 8 and transferring the data to the body ECU 6 by way of the wire communication unit 38. The memory unit 42 is a memory for storing, among other information, programs to be executed by the control unit 40.

It is to be noted that the body ECU 6 recognizes the type of an operation switch and the number of operations carried out on the switch or the operation duration on the basis of a control command received from the receiving apparatus 4. The control command is operation information transmitted by the portable transmitting apparatus 2. On the basis of a result of recognition, the body ECU 6 determines whether vehicle control such as an operation to unlock the doors is to be executed. If the body ECU 6 determines that the vehicle control is to be executed, the body ECU 6 outputs a control command to any one of other control apparatuses connected to a vehicle internal LAN as an apparatus for executing the control. An example of the other control apparatuses is a door ECU 7 provided on each door of the vehicle as a control apparatus for locking and unlocking the door as well as opening and closing the power window of the door. Another example of the other control apparatuses is a trunk ECU 9 provided in the trunk room for opening the trunk lid.

Figure 2A:
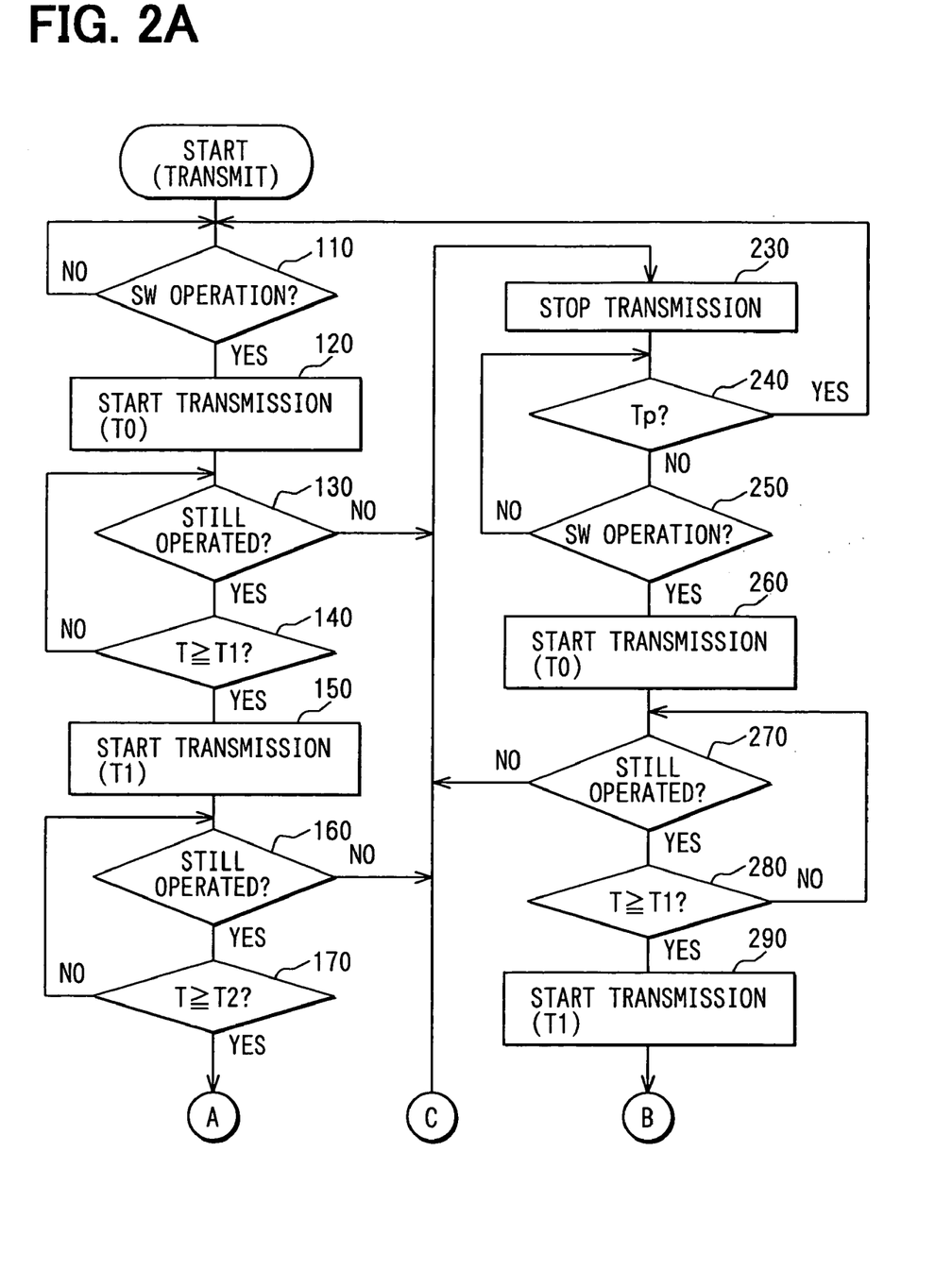
FIGS. 2A and 2B are flowcharts showing a control process carried out by a transmitting apparatus provided by the embodiment.
Figure 2B:
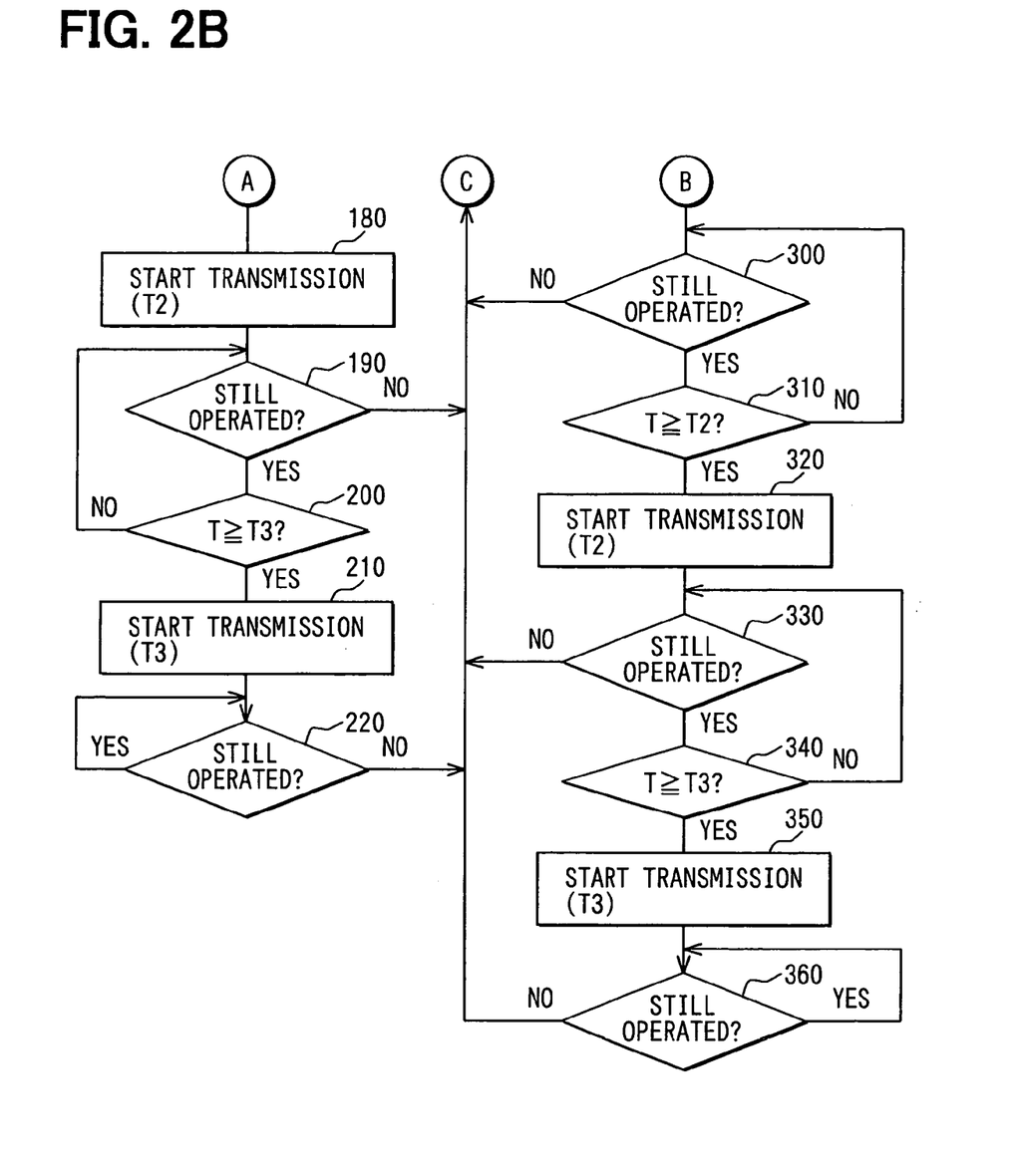
Figure 3A:
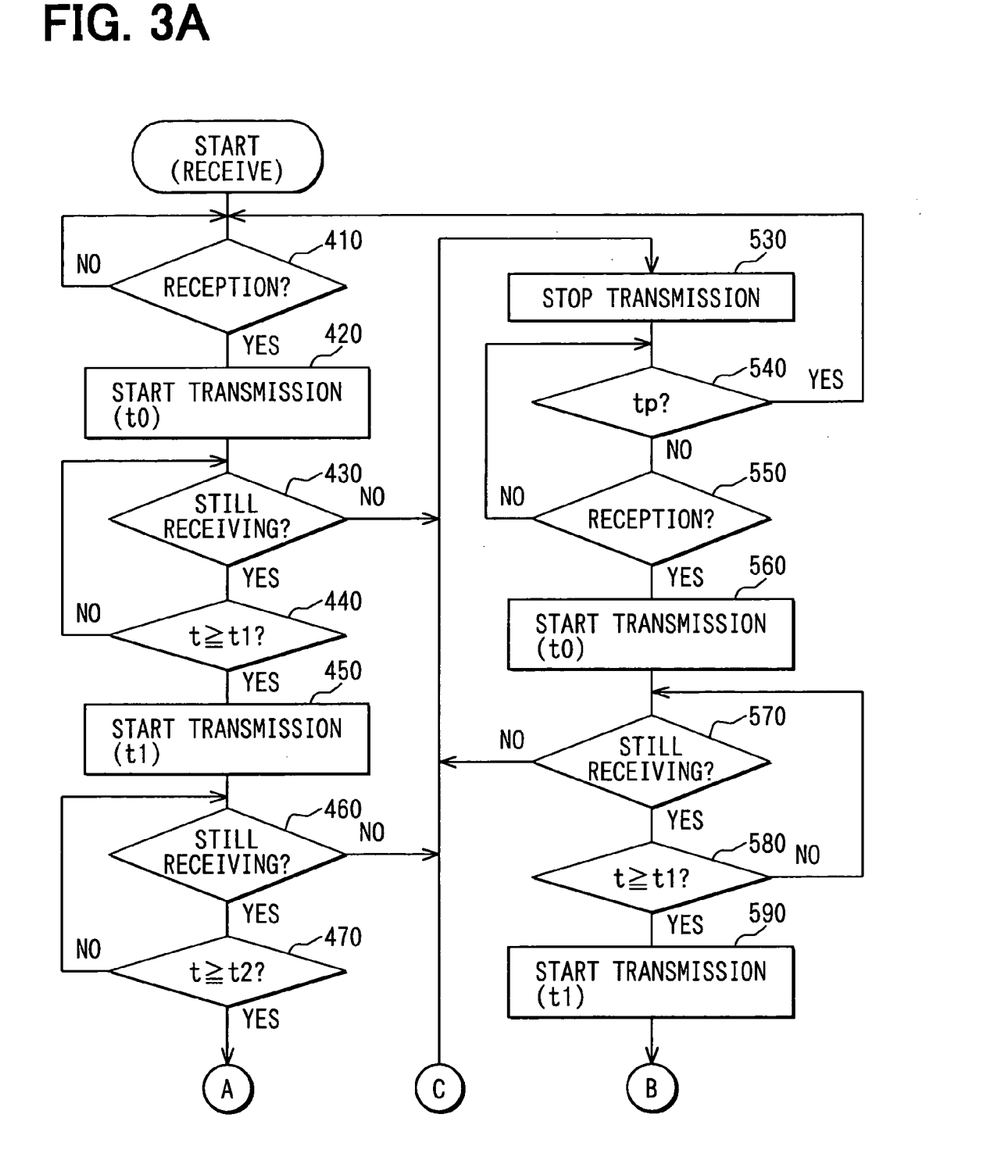
FIGS. 3A and 3B are flowcharts representing a control process carried out by a receiving apparatus provided by the embodiment.
Figure 3B:
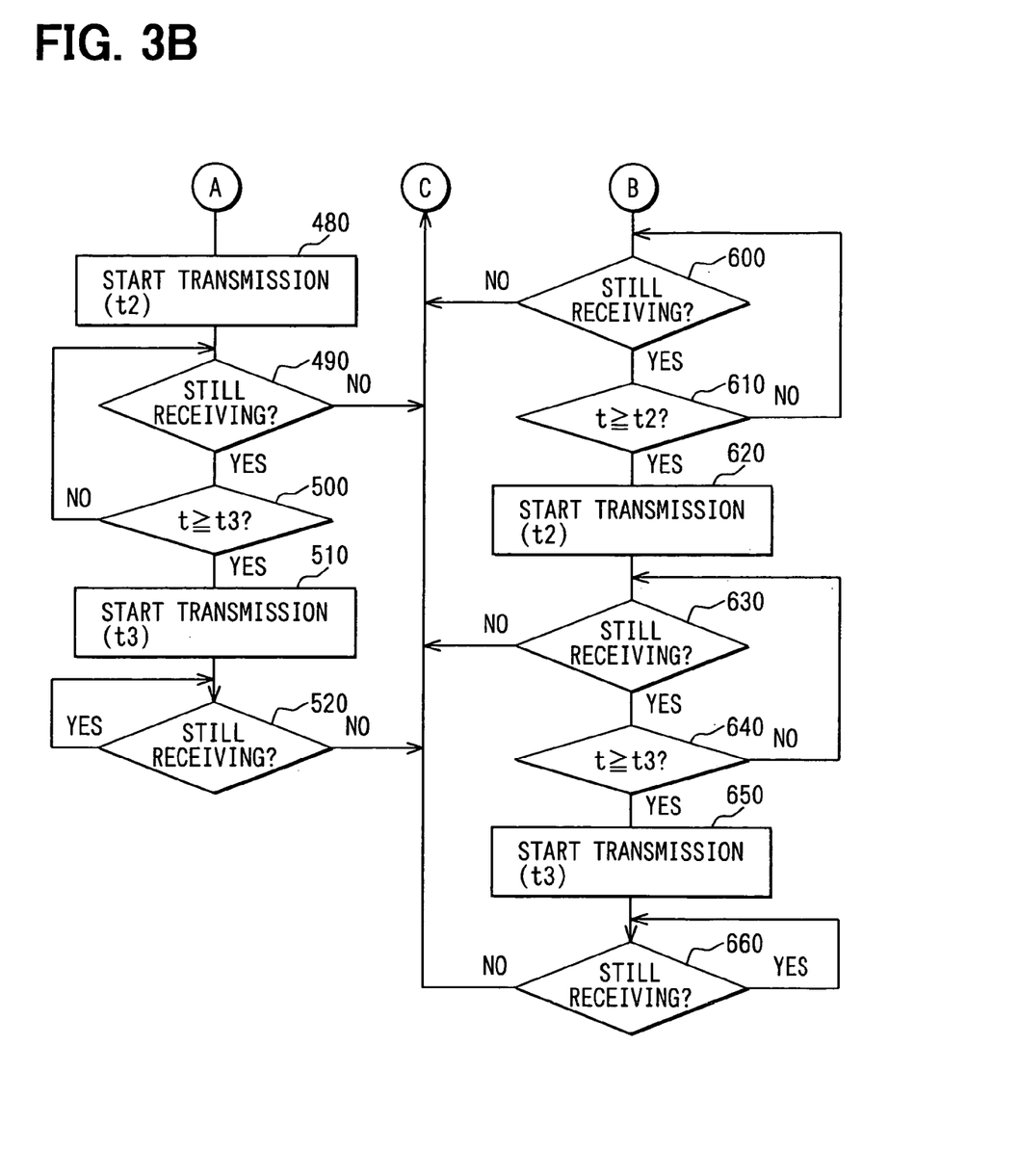

FIGS. 2A and 2B show a control process carried out by the control unit 20 employed in the portable transmitting apparatus 2 to transmit operation information to the receiving apparatus 4. FIGS. 3A and 3B show a control process carried out by the control unit 40 employed in the receiving apparatus 4 to receive the operation information from the portable transmitting apparatus 2.

The control process in FIGS. 2A and 2B is always carried out in the portable transmitting apparatus 2. The control process begins with a step 110 to determine which of the operation switches has been operated. As described above, the operation switches include the door lock switch 11, the door unlock switch 12, the power window switch 13 and the trunk switch 14. If none of the operation switches have been operated, the step is repeated in a state of waiting for any of the operation switches to be operated.

Figure 4A:
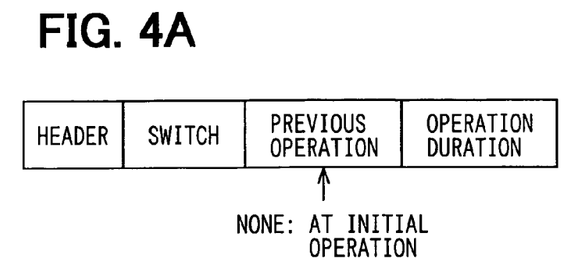
FIGS. 4A and 4B are diagrams showing formats of operation information transmitted by the transmitting apparatus and of a command issued by the receiving apparatus to a body ECU.

If any of the operation switches is determined operated at the step 110, on the other hand, the control process proceeds to a step 120 to generate operation information, which comprises present switch information indicating the type of the operated operation switch, previous operation information (none) indicating that previous operation information does not exist and operation duration information (T0) indicating that the continuous operation duration of the operated operation switch is shorter than a first operation duration T1. Then, continuous transmission control of the generated operation information is started to repeatedly and continuously transmit data comprising the generated operation information and a header appended to the operation information from the radio transmitter unit 18. The header includes an identification code assigned to the portable transmitting apparatus 2. As described above, the generated operation information comprises the present switch information, the previous operation information (none) and the operation duration information (T0). The format of the repeatedly and continuously transmitted data is shown in FIG. 4A.

After the continuous transmission control of the generated operation information is started at the step 120, the control process proceeds to a step 130 to determine whether the operation switch determined operated at the step 110 is still in the state of being operated or the operation carried out on the operation switch has been stopped. If the determination result obtained at the step 130 indicates that the operation carried out on the operation switch has been stopped, the control process proceeds to a step 230 at which the transmission of the operation information from the radio transmitter unit 18 is stopped.

If the determination result obtained at the step 130 indicates that the operation switch is still in the state of being operated, on the other hand, the control process proceeds to a step 140 to determine whether a first predetermined time T1 has lapsed since the step 110 at which the operation switch was determined to have been operated, that is, whether the duration T of the continuous operation of the operation switch has exceeded the first predetermined time T1. If the determination result obtained at the step 140 indicates that the duration of the continuous operation of the operation switch has not exceeded the first predetermined time T1, the control process returns to the step 130. If the determination result obtained at the step 140 indicates that the duration T of the continuous operation of the operation switch has exceeded the first predetermined time T1, on the other hand, the control process proceeds to a step 150.

At the step 150, the operation duration information (T0) of the operation information transmitted from the radio transmitter unit 18 is updated to operation duration information (T1) indicating that the duration of the continuous operation of the operation switch has exceeded the first predetermined time T1. As described above, the operation information is previously comprised of the present switch information, the previous operation information (none) and the operation duration information (T0). Then, continuous transmission control is started to continuously and repeatedly transmit the updated operation information comprising the present switch information, the previous operation information (none) and the operation duration information (T1) from the radio transmitter unit 18.

After the continuous transmission control is started to continuously and repeatedly transmit the operation information including the updated operation duration information at the step 150, the control process proceeds to a step 160 to determine whether the operation switch is still in the state of being operated or the operation carried out on the operation switch has been stopped in the same way as the step 130. If the determination result indicates that the operation carried out on the operation switch has been stopped, the control process proceeds to the step 230 at which the transmission of the operation information from the radio transmitter unit 18 is stopped. If the determination result indicates that the operation switch is still in the state of being operated, on the other hand, the control process proceeds to a step 170 to determine whether the duration T of the continuous operation of the operation switch has exceeded a second predetermined time T2, which is longer than the first predetermined time T1.

If the determination result obtained at the step 170 indicates that the duration T of the continuous operation of the operation switch has not exceeded the second predetermined time T2, the control process returns to the step 160. If the determination result indicates that the duration of the continuous operation of the operation switch has exceeded the second predetermined time T2, on the other hand, the control process proceeds to a step 180.

At the step 180, the operation duration information (T1) of the operation information transmitted from the radio transmitter unit 18 is updated to operation duration information (T2) indicating that the duration of the continuous operation of the operation switch has exceeded the second predetermined time T2. As described above, the operation information is previously comprised of the present switch information, the previous operation information (none) and the operation duration information (T1). Then, continuous transmission control is started to continuously and repeatedly transmit the updated operation information comprising the present switch information, the previous operation information (none) and the operation duration information (T2) from the radio transmitter unit 18.

After the continuous transmission control is started to continuously and repeatedly transmit the operation information including the updated operation duration information at the step 180, the control process proceeds to a step 190 to determine whether the operation switch is still in the state of being operated or the operation carried out on the operation switch has been stopped in the same way as the steps 130 and 160. If the determination result indicates that the operation carried out on the operation switch has been stopped, the control process proceeds to the step 230 at which the transmission of the operation information from the radio transmitter unit 18 is stopped. If the determination result indicates that the operation switch is still in the state of being operated, on the other hand, the control process proceeds to a step 200 to determine whether the duration of the continuous operation of the operation switch has exceeded a third predetermined time T3, which is even longer than the second predetermined time T2.

If the determination result obtained at the step 200 indicates that the duration of the continuous operation of the operation switch has not exceeded the third predetermined time T3, the control process returns to the step 190. If the determination result indicates that the duration of the continuous operation of the operation switch has exceeded the third predetermined time T3, on the other hand, the control process proceeds to a step 210.

At the step 210, the operation duration information (T2) of the operation information transmitted from the radio transmitter unit 18 is updated to operation duration information (T3) indicating that the duration of the continuous operation of the operation switch has exceeded the third predetermined time T3. As described above, the operation information is previously comprised of the present switch information, the previous operation information (none) and the operation duration information (T2). Then, continuous transmission control is started to continuously and repeatedly transmit the updated operation information comprising the present switch information, the previous operation information (none) and the operation duration information (T3) from the radio transmitter unit 18.

After the continuous transmission control is started to continuously and repeatedly transmit the operation information including the updated operation duration information at the step 210, the control process proceeds to a step 220 to determine whether the operation switch is still in the state of being operated or the operation carried out on the operation switch has been stopped in the same way as the steps 130, 160 and 190. If the determination result obtained at this step 220 indicates that the operation switch is still in the state of being operated, the control process returns to the step 220 to repeat the processing in a state of waiting for the operation carried out on the operation switch to be ended. As the determination result indicates that the operation carried out on the operation switch has been ended, the control process proceeds to the step 230 at which the transmission of the operation information from the radio transmitter unit 18 is stopped.

After the transmission of the operation information from the radio transmitter unit 18 is stopped at the step 230, the control process proceeds to a step 240 to determine whether a predetermined period of time Tp has lapsed since the transmission of the operation information from the radio transmitter unit 18 was stopped. It is to be noted that the lapse of this predetermined period of time Tp is checked to determine whether the user has operated an operation switch or operation switches consecutively two times in a row during this period as follows.

If the determination result obtained at the step 240 indicates that the predetermined period of time Tp has not lapsed since the transmission of the operation information from the radio transmitter unit 18 was stopped, the control process proceeds to a step 250 to determine whether any of the operation switches has been operated. If none of the operation switches have been operated, the control process returns to the step 240. If any of the operation switches determined operated, on the other hand, the control process proceeds to a step 260.

It is to be noted that, if the determination result obtained at the step 240 indicates that the predetermined period of time Ts has lapsed since the transmission of the operation information was stopped, that is, none of the operation switches was operated after the predetermined period of time Tp has lapsed since the transmission of the operation information was stopped, the control process returns to the step 110.

At the step 260, operation information is newly generated. The generated operation information comprises present switch information indicating the type of an operation switch operated this time, new previous operation information and operation duration information (T0) indicating that the duration of the continuous operation of the operated operation switch is shorter than a first operation duration T1. In this embodiment, the new previous operation information included in the generated operation information is the switch information included in the previous operation information, the transmission of which was stopped at the step 230. Then, continuous transmission control of the generated operation information is started to repeatedly and continuously transmit data comprising the generated operation information and a header appended to the operation information from the radio transmitter unit 18. The header includes an identification code assigned to the portable transmitting apparatus 2. The generated operation information comprises the present switch information, the previous operation information (which is the previous switch information) and the operation duration information (T0) as described above. The format of the repeatedly and continuously transmitted data is shown in FIG. 4A.

After the continuous transmission control of the generated operation information is started at the step 260, the control process proceeds to a step 270 to carry out the same determination process as the steps 130 and 140. More specifically, the state of the operation switch is checked at the step 270 to determine whether the operation switch is still in the state of being operated or the operation carried out on the operation switch has been stopped. If the determination result indicates that the operation carried out on the operation switch has been stopped, the control process proceeds to the step 230. If the determination result indicates that the operation switch is still in the state of being operated, on the other hand, the control process proceeds to the step 280 to determine whether the duration of the continuous operation of the operation switch has exceeded the first predetermined time T1. If the determination result indicates that the duration of the continuous operation of the operation switch has not exceeded the first predetermined time T1, the control process returns to the step 270. If the determination result indicates that the duration of the continuous operation of the operation switch has exceeded the first predetermined time T1, on the other hand, the control process proceeds to the step 290.

At the step 290, the operation duration information (T0) of the operation information transmitted from the radio transmitter unit 18 is updated to operation duration information (T1). As described above, the operation information is previously comprised of the present switch information, the previous operation information (which is the previous switch information) and the operation duration information (T0). Then, continuous transmission control is started to continuously and repeatedly transmit the updated operation information comprising the present switch information, the previous operation information (none) and the operation duration information (T1) from the radio transmitter unit 18.

After the continuous transmission control is started to continuously and repeatedly transmit the operation information including the updated operation duration information at the step 290, the control process proceeds to a step 300 to carry out the same determination process as the step 160. Then, similarly, a determination process may be carried out at a step 310 in a way identical to the step 170. More specifically, the state of the operation switch is checked at the step 300 to determine whether the operation switch is still in the state of being operated or the operation carried out on the operation switch has been stopped.

If the determination result indicates that the operation carried out on the operation switch has been stopped, the control process proceeds to the step 230. If the determination result indicates that the operation switch is still in the state of being operated, on the other hand, the control process proceeds to the step 310 to determine whether the duration of the continuous operation of the operation switch has exceeded the second predetermined time T2. If the determination result indicates that the duration of the continuous operation of the operation switch has not exceeded the second predetermined time T2, the control process returns to the step 300. If the determination result indicates that the duration of the continuous operation of the operation switch has exceeded the second predetermined time T2, on the other hand, the control process proceeds to a step 320.

At the step 320, the operation duration information (T1) of the operation information transmitted from the radio transmitter unit 18 is updated to operation duration information (T2). As described above, the operation information is previously comprised of the present switch information, the previous operation information (which is the previous switch information) and the operation duration information (T1). Then, continuous transmission control is started to continuously and repeatedly transmit the updated operation information comprising the present switch information, the previous operation information (which is the previous switch information) and the operation duration information (T2) from the radio transmitter unit 18.

After the continuous transmission control is started to continuously and repeatedly transmit the operation information including the updated operation duration information at the step 320, the control process proceeds to a step 330 to carry out the same determination process as the step 190. Then, similarly, a determination process may be carried out at a step 340 in a way identical to the step 200. More specifically, the state of the operation switch is checked at the step 330 to determine whether the operation switch is still in the state of being operated or the operation carried out on the operation switch has been stopped.

If the determination result indicates that the operation carried out on the operation switch has been stopped, the control process proceeds to the step 230. If the determination result indicates that the operation switch is still in the state of being operated, on the other hand, the control process proceeds to a step 340 to determine whether the duration of the continuous operation of the operation switch has exceeded the third predetermined time T3. If the determination result indicates that the duration of the continuous operation of the operation switch has not exceeded the third predetermined time T3, the control process returns to the step 330. If the determination result indicates that the duration of the continuous operation of the operation switch has exceeded the third predetermined time T3, on the other hand, the control process proceeds to a step 350.

At the step 350, the operation duration information (T2) of the operation information transmitted from the radio transmitter unit 18 is updated to operation duration information (T3). As described above, the operation information is previously comprised of the present switch information, the previous operation information (which is the previous switch information) and the operation duration information (T2). Then, continuous transmission control is started to continuously and repeatedly transmit the updated operation information comprising the present switch information, the previous operation information (which is the previous switch information) and the operation duration information (T3) from the radio transmitter unit 18.

After the continuous transmission control is started to continuously and repeatedly transmit the operation information including the updated operation duration information at the step 350, the control process proceeds to a step 360 to determine whether the operation switch is still in the state of being operated or the operation carried out on the operation switch has been stopped in the same way as the step 220. If the determination result indicates that the operation switch is still in the state of being operated, the control process returns to the step 360 to repeat the processing in a state of waiting for the operation carried out on the operation switch to be ended. As the determination result indicates that the operation carried out on the operation switch has been ended, the control process proceeds to the step 230 at which the transmission of the operation information from the radio transmitter unit 18 is stopped.

The control process shown in FIGS. 3A and 3B is always carried out by the control unit 40 employed in the receiving apparatus 4 as follows. The control process begins with a step 410 to determine whether the reception processing unit 34 has received operation information transmitted by the portable transmitting apparatus 2 serving as a communication partner of the receiving apparatus 4. More specifically, the operation information received by the reception processing unit 34, if any, is checked to find out whether a header appended to the information includes an identification code assigned to the portable transmitting apparatus 2 serving as a communication partner of the receiving apparatus 4 to determine whether the reception processing unit 34 has received operation information destined for the vehicle on which the receiving apparatus 4 is mounted.

Figure 4B:
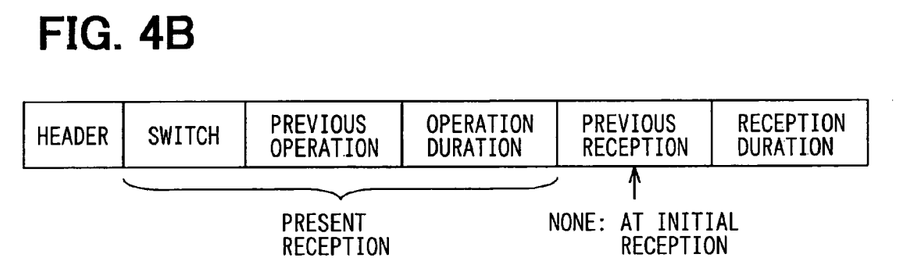

If the determination result obtained at the step 410 indicates that the operation information has been received, the control process proceeds to a step 420 to generate information as a command to be given to the body ECU 6. The generated command includes the received operation information, which comprises switch information, previous operation information and reception duration information. The command also comprises previous operation information (none) indicating that previous operation information does not exist and reception duration information (t0) indicating that the duration of the continuous reception of the received operation information is shorter than a first reception duration t1. Then, continuous transmission control of the generated command is started to repeatedly and continuously transmit data comprising the generated command and a header appended to the command from the wire communication unit 38 to the body ECU 6. The header includes an identification code assigned to the receiving apparatus 4. As described above, the generated command comprises the present received operation information, the previous operation information (none) and the reception duration information (t0). The format of the repeatedly and continuously transmitted command and the header is shown in FIG. 4B.

After the continuous transmission control of the generated operation information is started at the step 420, the control process proceeds to a step 430 to determine whether the radio receiver unit 32 is continuously receiving the operation information transmitted by the portable transmitting apparatus 2 and the reception processing unit 34 is supplying the information to the control unit 40 without suspension or whether the radio receiver unit 32 and the reception processing unit 34 are still in the state of receiving the operation information.

If the determination result obtained at the step 430 indicates that the radio receiver unit 32 and the reception processing unit 34 are no longer in a state of receiving the operation information, the control process proceeds to a step 530 at which the transmission of the command from the wire communication unit 38 is stopped. If the determination result obtained at the step 430 indicates that the radio receiver unit 32 and the reception processing unit 34 are still in the state of receiving the operation information, on the other hand, the control process proceeds to a step 440 to determine whether a first predetermined duration t1 has lapsed since the step 410 at which the operation information was determined to have been received, that is, whether the duration of the continuous reception of the operation information has exceeded the first predetermined duration t1.

If the determination result obtained at the step 440 indicates that the duration of the continuous reception of the operation information has not exceeded the first predetermined duration t1, the control process returns to the step 430. If the determination result obtained at the step 440 indicates that the duration of the continuous reception of the operation information has exceeded the first predetermined duration t1, on the other hand, the control process proceeds to a step 450.

At the step 450, the reception duration information (t0) of the command transmitted from the wire communication unit 38 is updated to reception duration information (t1) indicating that the duration of the continuous reception of the operation information has exceeded the first predetermined duration t1. As described above, the command is previously comprised of the present received operation information, the previous operation information (none) and the reception duration information (t0). Then, continuous transmission control is started to continuously and repeatedly transmit the updated command comprising the present received operation information, the previous operation information (none) and the reception duration information (t1) from the wire communication unit 38 to the body ECU 6.

After the continuous transmission control is started to continuously and repeatedly transmit the command including the updated reception duration information at the step 450, the control process proceeds to a step 460 to determine whether the radio receiver unit 32 and the reception processing unit 34 are still in the state of receiving the operation information in the same way as the step 430. If the determination result indicates that the radio receiver unit 32 and the reception processing unit 34 are no longer in a state of receiving the operation information, the control process proceeds to the step 530 at which the transmission of the command from the wire communication unit 38 is stopped. If the determination result indicates that the radio receiver unit 32 and the reception processing unit 34 are still in the state of receiving the operation information, on the other hand, the control process proceeds to a step 470 to determine whether the duration of the continuous reception of the operation information has exceeded a second predetermined duration t2, which is longer than the first predetermined duration t1.

If the determination result obtained at the step 470 indicates that the duration of the continuous reception of the operation information has not exceeded the second predetermined duration t2, the control process returns to the step 460. If the determination result indicates that the duration of the continuous reception of the operation information has exceeded the second predetermined duration t2, on the other hand, the control process proceeds to a step 480.

At the step 480, the reception duration information (t1) of the command transmitted from the wire communication unit 38 is updated to reception duration information (t2) indicating that the duration of the continuous reception of the operation information has exceeded the second predetermined duration t2. As described above, the command is previously comprised of the present received operation information, the previous operation information (none) and the reception duration information (t1). Then, continuous transmission control is started to continuously and repeatedly transmit the updated command comprising the present received operation information, the previous operation information (none) and the reception duration information (t2) from the wire communication unit 38 to the body ECU 6.

After the continuous transmission control is started to continuously and repeatedly transmit the command including the updated reception duration information at the step 480, the control process proceeds to a step 490 to determine whether the radio receiver unit 32 and the reception processing unit 34 are still in the state of receiving the operation information in the same way as the steps 430 and 460. If the determination result indicates that the radio receiver unit 32 and the reception processing unit 34 are no longer in a state of receiving the operation information, the control process proceeds to the step 530 at which the transmission of the command from the wire communication unit 38 is stopped. If the determination result indicates that the radio receiver unit 32 and the reception processing unit 34 are still in the state of receiving the operation information, on the other hand, the control process proceeds to a step 500 to determine whether the duration of the continuous reception of the operation information has exceeded a third predetermined duration t3, which is even longer than the second predetermined duration t2.

If the determination result obtained at the step 500 indicates that the duration of the continuous reception of the operation information has not exceeded the third predetermined duration t3, the control process returns to the step 490. If the determination result indicates that the duration of the continuous reception of the operation information has exceeded the third predetermined duration t3, on the other hand, the control process proceeds to a step 510.

At the step 510, the reception duration information (t2) of the command transmitted from the wire communication unit 38 is updated to reception duration information (t3) indicating that the duration of the continuous reception of the operation information has exceeded the third predetermined duration t3. As described above, the command is previously comprised of the present received operation information, the previous operation information (none) and the reception duration information (t2). Then, continuous transmission control is started to continuously and repeatedly transmit the updated command comprising the present received operation information, the previous operation information (none) and the reception duration information (t3) from the wire communication unit 38 to the body ECU 6.

After the continuous transmission control is started to continuously and repeatedly transmit the command including the updated reception duration information at the step 510, the control process proceeds to a step 520 to determine whether the radio receiver unit 32 and the reception processing unit 34 are still in the state of receiving the operation information in the same way as the steps 430, 460 and 490. If the determination result obtained at this step 520 indicates that the radio receiver unit 32 and the reception processing unit 34 are still in the state of receiving the operation information, the control process returns to the step 520 to repeat the processing in a state of waiting for the radio receiver unit 32 and the reception processing unit 34 to exit from the state of receiving the operation information. As the determination result indicates that the radio receiver unit 32 and the reception processing unit 34 are no longer in a state of receiving the operation information, the control process proceeds to the step 530 at which the transmission of the command from the wire communication unit 38 is stopped.

After the transmission of the command from the wire communication unit 38 is stopped at the step 530, the control process proceeds to a step 540 to determine whether a predetermined period of time tp has lapsed since the transmission of the command from the wire communication unit 38 was stopped. It is to be noted that the lapse of this predetermined period of time tp is checked to determine whether the user has operated an operation switch or operation switches consecutively two times in a row during this period as follows.

If the determination result obtained at the step 540 indicates that the predetermined period of time tp has not lapsed since the transmission of the command from the wire communication unit 38 was stopped, the control process proceeds to a step 550 to determine whether the reception processing unit 34 has received operation information for the vehicle, on which the receiving apparatus 4 is mounted. If the reception processing unit 34 has not received such operation information, the control process returns to the step 540. If the reception processing unit 34 has received such operation information, on the other hand, the control process proceeds to a step 560.

It is to be noted that, if the determination result obtained at the step 540 indicates that the predetermined period of time tp has lapsed since the transmission of the operation information was stopped, that is, the reception processing unit 34 did not receive operation information for the vehicle after the predetermined period of time tp has lapsed since the transmission of the operation information was stopped and, the control process returns to the step 410.

At the step 560, a command is generated. The generated command comprises operation information received by the reception processing unit 34 this time, the operation information received by the reception processing unit 34 previously and reception duration information (t0) indicating that the duration of the continuous reception of the operated operation switch is shorter than a first reception duration t1. The operation information received by the reception processing unit 34 this time comprises switch information, previous operation information and operation duration information. Similarly, the operation information received by the reception processing unit 34 previously comprises switch information, previous operation information and operation duration information, which were received previously.

Then, continuous transmission control of the generated command is started to repeatedly and continuously transmit data comprising the generated command and a header appended to the command from the wire communication unit 38 to the body ECU 6. The header includes an identification code assigned to the receiving apparatus 4. The generated command comprises operation information received this time, the operation information received previously and reception duration information (t0) as described above. The format of the repeatedly and continuously transmitted command and the header is shown in FIG. 4B.

After the continuous transmission control of the generated command is started at the step 560, the control process proceeds to a step 570 to carry out the same determination process as the step 430. Then, similarly, a determination process may be carried out at a step 580 in a way identical to the step 440. More specifically, the state of the radio receiver unit 32 and the state of the reception processing unit 34 are examined at the step 570 to determine whether the radio receiver unit 32 and the reception processing unit 34 are still in the state of receiving the operation information.

If the determination result indicates that the radio receiver unit 32 and the reception processing unit 34 are no longer in a state of receiving the operation information, the control process proceeds to the step 530.

If the determination result indicates that the radio receiver unit 32 and the reception processing unit 34 are still in the state of receiving the operation information, on the other hand, the control process proceeds to the step 580 to determine whether the duration of the continuous reception of the operation information has exceeded the first predetermined duration t1. If the determination result indicates that the duration of the continuous reception of the operation information has not exceeded the first predetermined duration t1, the control process returns to the step 570. If the determination result indicates that the duration of the continuous reception of the operation information has exceeded the first predetermined duration t1, on the other hand, the control process proceeds to the step 590.

At the step 590, the reception duration information (t0) of the command transmitted from the wire communication unit 38 is updated to reception duration information (t1). As described above, the command is previously comprised of operation information received this time, the operation information received previously and the reception duration information (t0). Then, continuous transmission control is started to continuously and repeatedly transmit the updated command comprising the operation information received this time, the operation information received previously (none) and the reception duration information (t1) from the wire communication unit 38 to the body ECU 6.

After the continuous transmission control is started to continuously and repeatedly transmit the command including the updated reception duration information at the step 590, the control process proceeds to a step 600 to carry out the same determination process as the step 460. Then, similarly, a determination process may be carried out at a step 610 in a way identical to the step 470. More specifically, the state of the radio receiver unit 32 and the state of the reception processing unit 34 are examined at the step 600 to determine whether the radio receiver unit 32 and the reception processing unit 34 are still in the state of receiving the operation information. If the determination result indicates that the radio receiver unit 32 and the reception processing unit 34 are no longer in a state of receiving the operation information, the control process proceeds to the step 530.

If the determination result indicates that the radio receiver unit 32 and the reception processing unit 34 are still in the state of receiving the operation information, on the other hand, the control process proceeds to the step 610 to determine whether the duration of the continuous reception of the operation information has exceeded the second predetermined duration t2. If the determination result indicates that the duration of the continuous reception of the operation information has not exceeded the second predetermined duration t2, the control process returns to the step 600. If the determination result indicates that the duration of the continuous reception of the operation information has exceeded the second predetermined duration t2, on the other hand, the control process proceeds to a step 620.

At the step 620, the reception duration information (t1) of the command transmitted from the wire communication unit 38 is updated to reception duration information (t2). As described above, the command is previously comprised of operation information received this time, the operation information received previously and the reception duration information (t1). Then, continuous transmission control is started to continuously and repeatedly transmit the updated command comprising the command is previously comprised of operation information received this time, the operation information received previously and the reception duration information (t2) from the wire communication unit 38 to the body ECU 6.

After the continuous transmission control is started to continuously and repeatedly transmit the command including the updated reception duration information at the step 620, the control process proceeds to a step 630 to carry out the same determination process as the step 490. Then, similarly, a determination process may be carried out at a step 640 in a way identical to the step 500. More specifically, the state of the radio receiver unit 32 and the state of the reception processing unit 34 are examined at the step 630 to determine whether the radio receiver unit 32 and the reception processing unit 34 are still in the state of receiving the operation information. If the determination result indicates that the radio receiver unit 32 and the reception processing unit 34 are no longer in a state of receiving the operation information, the control process proceeds to the step 530.

If the determination result indicates that the radio receiver unit 32 and the reception processing unit 34 are still in the state of receiving the, operation information, on the other hand, the control process proceeds to a step 640 to determine whether the duration of the continuous reception of the operation information has exceeded the third predetermined duration t3. If the determination result indicates that the duration of the continuous reception of the operation information has not exceeded the third predetermined duration t3, the control process returns to the step 630. If the determination result indicates that the duration of the continuous reception of the operation information has exceeded the third predetermined duration t3, on the other hand, the control process proceeds to a step 650.

At the step 650, the reception duration information (t2) of the command transmitted from the wire communication unit 38 is updated to reception duration information (t3). As described above, the command is previously comprised of operation information received this time, the operation information received previously and the reception duration information (t2). Then, continuous transmission control is started to continuously and repeatedly transmit the updated command comprising the operation information received this time, the operation information received previously and the reception duration information (t3) from the wire communication unit 38 to the body ECU 6.

After the continuous transmission control is started to continuously and repeatedly transmit the command including the updated reception duration information at the step 650, the control process proceeds to a step 660 to determine whether the radio receiver unit 32 and the reception processing unit 34 are still in the state of receiving the operation information in the same way as the step 520. If the determination result indicates that the radio receiver unit 32 and the reception processing unit 34 are still in the state of receiving the operation information, the control process returns to the step 660 to repeat the processing in a state of waiting for the radio receiver unit 32 and the reception processing unit 34 to exit from the state of receiving the operation information. As the determination result indicates that the radio receiver unit 32 and the reception processing unit 34 are no longer in a state of receiving the operation information, the control process proceeds to the step 530 at which the transmission of the command from the wire communication unit 38 is stopped.

As described above, in the communication system implemented by the embodiment as a system used in carrying out remote controls of a vehicle, if an operation is carried out on any specific one of the operation switches employed in the portable transmitting apparatus 2, the portable transmitting apparatus 2 thereafter continuously transmits operation information to the receiving apparatus 4 as a radio wave till the operation carried out on the specific operation switch is ended. As explained earlier, the operation switches include the door lock switch 11, the door unlock switch 12, the power window switch 13 and the trunk switch 14. As described before, the transmitted operation information includes switch information indicating the type of the operated specific operation switch and operation duration information (T0, T1, T2, T3 or T3) representing the duration of the continuous operation of the operated specific operation switch.

In addition, if another operation is carried out on any particular one of the operation switches after the specific operation switch has been operated but before a predetermined period of time lapses, the portable transmitting apparatus 2 thereafter continuously transmits operation information to the receiving apparatus 4 as a radio wave till the other operation carried out on the particular operation switch is ended. This time, however, the operation information includes not only switch information indicating the type of the operated particular operation switch and operation duration information (T0, T1, T2, T3 or T3) but also operation information for the specific operation switch operated previously. In the case of this embodiment, the operation information for the specific operation switch operated previously is the switch information of the specific operation switch.

When the receiving apparatus 4 receives operation information from the portable transmitting apparatus 2, the receiving apparatus 4 is thereafter transmitting the received operation information (that is, the operation information received this time) and reception duration information (t0, t1, t2 or t3) representing the duration of the continuous reception of the received operation information as a command for a remote control to the body ECU 6 till the reception of the present operation information is ended.

In addition, if operation information is newly received from the portable transmitting apparatus 2 before a predetermined period of time lapses since the reception of the previous operation information was once ended, the receiving apparatus 4 is thereafter transmitting information as a command for a remote control to the body ECU 6 till the reception of the present operation information is ended. This time, however, the command comprises the previous received operation information (that is, the operation information received previously) in addition to the present received operation information (that is, the operation information received this time) and reception duration information (t0, t1, t2 or t3) representing the duration of the continuous reception of the present received operation information.

In this way, in accordance with the communication system implemented by the embodiment as a system used in carrying out remote controls of a vehicle, the receiving apparatus 4 receives not only present switch information, that is, information on an operation switch operated at the portable transmitting apparatus 2 this time, but also information on the duration of a continuous operation carried out on the operation switch at the portable transmitting apparatus 2 and previous switch information, that is, information on an operation switch, which was operated previously at the portable transmitting apparatus 2 when the user operates an information switch or information switches consecutively twice in a row before and after a time interval.

In addition, the receiving apparatus 4 transmits a command to the body ECU 6 for controlling remote controls of the vehicle. The command includes not only the present operation information (which is the present switch information), that is, operation information received from the portable transmitting apparatus 2 this time, but also information on the duration of the continuous reception of the operation information received by the receiving apparatus 4 and previous operation information (which is the previous switch information), that is, operation information received from the portable transmitting apparatus 2 previously when the receiving apparatus 4 receives operation information from the portable transmitting apparatus 2 consecutively twice in a row before and after a time interval.

Thus, in the communication system, the body ECU 6 typically controls the door ECU 7 provided on each door of the vehicle to lock the door only when the door lock switch 11 on the portable transmitting apparatus 2 is operated consecutively twice in a row for example. Thus, the body ECU 6 is capable of determining that the door lock switch 11 has been operated twice consecutively from a command received from the receiving apparatus 4 even if the receiving apparatus 4 receives only the second operation information obtained as a result of the second operation carried out on the door lock switch 11 from the portable transmitting apparatus 2 without receiving the first operation information obtained as a result of the first operation carried out on the door lock switch 11 from the portable transmitting apparatus 2 in spite of the fact that the user has operated the door lock switch 11 twice consecutively. As a result, the door can be locked with a high degree of reliability. This is because the command comprises not only the present operation information (which is present switch information), that is, operation information received from the portable transmitting apparatus 2 this time, but also previous operation information (which is previous switch information), that is, operation information received from the portable transmitting apparatus 2 previously.

In addition, in the communication system, the body ECU 6 typically requests the trunk ECU 9 to open the trunk of the vehicle when the trunk switch 14 provided on the portable transmitting apparatus 2 is operated continuously for a period of time at least equal in length to the third operation duration T3. Thus, body ECU 6 is thereafter capable of determining that the trunk switch 14 has been operated continuously for a period of time at least equal in length to the third operation duration T3 from a command received from the receiving apparatus 4 even if, for a while after the start of the operation carried out on the trunk switch 14, the receiving apparatus 4 is not capable of receiving operation information transmitted by the portable transmitting apparatus 2 in spite of the fact that the user has been operating the trunk switch 14 continuously for a period of time at least equal in length to the third operation duration T3. This is because a command issued by the receiving apparatus to the body 6 includes not only switch information included in the present operation information, that is, operation information received from the portable transmitting apparatus 2 this time, but also operation duration information.

In addition, in the communication system, the body ECU 6 typically drives the door ECU 7 provided on each door of the vehicle to unlock the door only under the condition that the user operates the door unlock switch 12 consecutively twice in a row at a location in close proximity to the vehicle and, as a result of the 2 consecutive operations, the receiving apparatus 4 receives operation information from the portable transmitting apparatus 2 with a high degree of reliability so as to prevent the vehicle and articles put inside the vehicle from being stolen. Nevertheless, the body ECU 6 may not be capable of accurately determining whether the door unlock condition is satisfied for each door if the body ECU 6 uses only the present operation information included in a command given by the receiving apparatus 4 to the body ECU 6.

In the embodiment, however, a command transmitted by the receiving apparatus 4 to the body ECU 6 includes not only the present operation information, that is, the operation information received from the portable transmitting apparatus 2 this time, but also the previous operation information, that is, the operation information received from the portable transmitting apparatus 2 previously. Thus, on the basis of the present operation information and the previous operation information, which are included in the command received from the receiving apparatus 4, the body ECU 6 is capable of accurately determining whether the operation information has been received from the receiving apparatus 4 as a result of 2 consecutive operations carried out consecutively in a row on the door unlock switch 12 provided on the portable transmitting apparatus 2, that is, whether the door unlock condition is satisfied for each door, and hence capable of requesting the door ECU 7 to unlock each of the doors only if the door unlock condition is satisfied for each of the doors.

In addition, in the communication system, the body ECU 6 typically drives the door ECU 7 provided on each door of the vehicle to open the power window of each door only under the condition that the user operates the power window switch 13 at a location in close proximity to the vehicle and, as a result of the operation, the receiving apparatus 4 is receiving operation information from the portable transmitting apparatus 2 continuously for a period of time at least equal to the third predetermined duration t3 so as to prevent things from being inserted into a gap between a power window and the frame of the power window. Nevertheless, the body ECU 6 may not be capable of accurately determining whether this power window condition is satisfied for each door if the body ECU 6 uses only the present operation information and/or the previous operation information, which are included in a command given by the receiving apparatus 4 to the body ECU 6.

In the embodiment, however, a command transmitted by the receiving apparatus 4 to the body ECU 6 includes not only the present operation information, that is, the operation information received from the portable transmitting apparatus 2 this time, and the previous operation information, that is, the operation information received from the portable transmitting apparatus 2 previously, but also reception duration information representing the duration of the continuous reception of the present operation information.

Thus, on the basis of the present operation information and the reception duration information of the present operation information, which are included in the command received from the receiving apparatus 4, the body ECU 6 is capable of accurately determining whether the operation information has been received from the receiving apparatus 4 continuously for a period of time at least equal to the third predetermined duration t3 as a result of an operation carried out on the power window switch 13 provided on the portable transmitting apparatus 2, that is, whether the power window condition is satisfied, and capable of requesting the door ECU 7 to open the power window only if the power window condition is satisfied.

That is, in accordance with the communication system implemented by the embodiment as a system used in carrying out remote controls of a vehicle, if conditions for the body ECU 6 serving as a control apparatus for remote controls to execute the control of the vehicle are set by the type of an operation switch provided on the portable transmitting apparatus 2 and the number of operations carried out on the power switch or the duration of the operation carried out on the power switch, the recognition area provided for each operation switch on the portable transmitting apparatus 2 as a recognition area centered at the vehicle can be widened so as to allow the user to utilize the portable transmitting apparatus 2 with a higher degree of convenience.

In addition, even in the case of control causing a problem as a result of widening the recognition area of an operation switch in the body ECU 6, by accurately determining whether a condition for the body ECU 6 to execute the control is satisfied, the control can be executed with a high degree of accuracy. Thus, in accordance with the embodiment, conditions for remotely carrying out a variety of operations in the body ECU 6 can be set properly to raise the degree of freedom of the control for the remote controls.

It is to be noted that, in this embodiment, the radio transmitter unit 18 employed in the portable transmitting apparatus 2 corresponds to a transmission means of the transmitting apparatus provided by the present invention whereas the radio receiver unit 32 and the reception processing unit 34, which are employed in the receiving apparatus 4, correspond to a reception means of the receiving apparatus provided by the present invention.

In addition, in this embodiment, the determination processes carried out at the steps 110, 240 and 250 of the control processing performed by the control unit 20 employed in the portable transmitting apparatus 2 correspond to an operation determination means of the transmitting apparatus, the determination processes carried out at the steps 120 to 220 of the same control processing correspond to a first transmission control means of the transmitting apparatus provided by the present invention and the determination processes carried out at the steps 260 to 360 of the same control processing correspond to a second transmission control means of the transmitting apparatus provided by the present invention.

In addition, in this embodiment, the determination processes carried out at the steps 410, 540 and 550 of the control processing performed by the control unit 40 employed in the receiving apparatus 4 correspond to a reception determination means of the transmitting apparatus provided by the present invention, the determination processes carried out at the steps 420 to 520 of the same control processing correspond to a first output control means of the receiving apparatus provided by the present invention and the determination processes carried out at the steps 560 to 660 of the same control processing correspond to a second output control means of the receiving apparatus provided by the present invention.

In the embodiment described above, for example, the receiving apparatus 4 supplies information as a command to the body ECU 6 and, as explained earlier, the command comprises present operation information received from the portable transmitting apparatus 2 this time, additional previous operation information received from the portable transmitting apparatus 2 previously and additional reception duration information representing the duration of the continuous reception of the present operation information. However, the receiving apparatus 4 does not have to add the previous operation information and the reception duration information to the present operation information. That is, the receiving apparatus 4 may transmit only the present operation information as it is to the body ECU 6 or the like, which serves as a control apparatus of the vehicle. As another alternative, the receiving apparatus 4 may transmit the present operation information and the additional previous operation information or the additional reception duration information to the body ECU 6 or the like, which serves as a control apparatus of the vehicle.

In addition, in this embodiment described above, the portable transmitting apparatus 2 transmits operation information to the receiving apparatus 4 and, as explained earlier, the operation information comprises present switch information representing the type of an operation switch operated by the user this time, additional previous operation information (which is the previous switch information) and additional operation duration information. However, the portable transmitting apparatus 2 does not have to add both the previous operation information and the operation duration information to the present switch information. That is, the portable transmitting apparatus 2 may also add only either the previous operation information or the operation duration information to the present switch information.

In addition, as the additional previous operation information, only previous switch information representing a previous switch operation as described before or switch information representing a previous switch operation and previous operation duration information can be added to the present switch information. That is, data included in operation information transmitted by the portable transmitting apparatus 2 to the receiving apparatus 4 and data included in a command given by the receiving apparatus 4 to the body ECU 6 can be set appropriately in accordance with a condition for execution of remote control control by the body ECU 6.

In addition, in the embodiment described above, to allow operations such as operations to lock and unlock the doors of a vehicle, open and close the power windows of the doors and open the trunk room of the vehicle to be carried out remotely from a location outside the vehicle, the portable transmitting apparatus 2 is provided with operation switches including the door lock switch 11, the door unlock switch 12, the power window switch 13 and the trunk switch 14. To allow operations such as operations to open and close a slide door and a back door as well as operations to start and stop the engine to be carried out remotely from a location outside the vehicle, the portable transmitting apparatus 2 can also be provided with switches for remotely controlling these operations.

As another alternative, by setting an "n" operation-unique condition for each of the operations carried out on the door lock switch 11, the door unlock switch 12, the power window switch 13 and the trunk switch 14, which are provided on the portable transmitting apparatus 2, other operations can be carried out remotely by operating an operation switch or a plurality of operation switches provided on the portable transmitting apparatus 2.

What is claimed is:

1. A communication system for remotely controlling a vehicle, the communication system comprising:
    a portable transmitting apparatus, provided with a plurality of operation switches for remotely controlling components employed in the vehicle, for transmitting operation information representing an operation state of any specific one of the operation switches as a radio wave when any specific one of the specific operation switches is operated; and
    a receiving apparatus, mounted on the vehicle, for receiving operation information transmitted by the transmitting apparatus and outputting the received operation information to a control apparatus employed in the vehicle as a command for controlling the vehicle,
    wherein the transmitting apparatus is constructed to
    transmit, when an operation is carried out on any specific one of the operation switches, a radio wave conveying switch information representing the type of the specific operation switch operated this time as the operation information till an end of the operation carried out on the specific operation switch, and
    transmit, if an operation is carried out again on any particular one of the operation switches before a predetermined period of time lapses since the end of the operation carried out on the specific operation switch, a radio wave conveying switch information representing the type of the particular operation switch operated this time and previous switch information, which was transmitted previously when the specific operation switch was operated, till an end of the operation carried out on the particular operation switch.

2. A communication system for remotely controlling a vehicle, the communication system comprising:
    a portable transmitting apparatus, provided with a plurality of operation switches for remotely controlling components employed in the vehicle, for transmitting operation information representing an operation state of any specific one of the operation switches as a radio wave when the specific operation switch is operated; and
    a receiving apparatus, mounted on the vehicle, for receiving operation information transmitted by the transmitting apparatus and for outputting the received operation information to a control apparatus employed in the vehicle as a command for controlling the vehicle,
    wherein the transmitting apparatus is constructed to transmit, when an operation is carried out on any specific one of the operation switches, a radio wave, which conveys switch information representing the type of the operated specific operation switch and operation duration information indicating the duration of a continuous operation carried out on the operated specific operation switch, as the operation information till an end of the operation carried out on the specific operation switch.

3. A communication system for remotely controlling a vehicle as in claim 2,
    wherein the transmitting apparatus is constructed to transmit, if an operation is carried out again on any particular one of the operation switches before a predetermined period of time lapses since the end of the operation carried out on the specific operation switch, switch information representing the type of the particular operation switch operated this time, operation duration information indicating the duration of a continuous operation carried out on the operated particular operation switch and previous operation information, which was transmitted previously when the specific operation switch was operated, or switch information included in the previous operation information as a radio wave till an end of the operation carried out on the particular operation switch.

4. A communication system for remotely controlling a vehicle as in claim 1, wherein the receiving apparatus is constructed to
output, when specific reception of the operation information is started, the received operation information to the control apparatus employed in the vehicle as the command till an end of the specific reception of the operation information, and
output, if other reception of the operation information is started before a predetermined period of time lapses since the end of the specific reception of the operation information, the operation information received in the other reception to the control apparatus employed in the vehicle as the command till an end of the other reception of the operation information.

5. A communication system for remotely controlling a vehicle as in claim 2,
wherein, the receiving apparatus is constructed to output, when specific reception of the operation information is started, the received operation information and reception duration information representing a reception duration in a period of the specific reception of the operation information to the control apparatus employed in the vehicle as the command till an end of the specific reception of the operation information.

6. A communication system for remotely controlling a vehicle as in claim 3,
wherein the receiving apparatus is constructed to
output, when specific reception of the operation information is started, the received operation information and reception duration information representing a reception duration in a period of the specific reception of the operation information to the control apparatus employed in the vehicle as the command till an end of the specific reception of the operation information, and
output, if other reception of the operation information is started before a predetermined period of time lapses since the end of the specific reception of the operation information, the operation information received in the other transmitting and receiving duration information representing a reception duration in a period of the other reception of the operation information to the control apparatus employed in the vehicle as the command till an end of the other reception of the operation information.

7. A portable transmitting apparatus comprising:
a plurality of operation switches for remotely controlling components employed in a vehicle;
a transmission means for transmitting operation information representing an operation state of any specific one of the operation switches as a radio wave when the specific operation switch is operated;
an operation determination means for determining whether a predetermined period of time has lapsed since an end of an operation previously carried out on any of the operation switches when an operation is carried out this time on a particular one of the operation switches;
a first transmission control means for letting switch information indicating the type of the particular operation switch operated this time be transmitted as the operation information from the transmitting apparatus till an end of the operation carried out this time on the particular operation switch after the operation determination means determines that the predetermined period of time has lapsed since the end of the operation previously carried out on any of the operation switches; and
a second transmission control means for letting switch information indicating the type of the particular operation switch operated this time and switch information transmitted in the operation previously carried out on any of the operation switches be transmitted as the operation information from the transmitting apparatus till an end of the operation carried out this time on the particular operation switch after the operation determination means determines that the predetermined period of time has not lapsed since the end of the operation previously carried out on any of the operation switches.

8. A portable transmitting apparatus comprising:
a plurality of operation switches for remotely controlling components employed in a vehicle;
a transmission means for transmitting operation information representing an operation state of any specific one of the operation switches as a radio wave; and
a first transmission control means for letting switch information indicating the type of the specific operation switch operated this time and operation duration information representing the duration of a continuous operation carried out on the specific operation switch be transmitted as the operation information from the transmitting apparatus after the continuous operation carried out on the specific operation switch is started till an end of the operation.

9. A portable transmitting apparatus as in claim 8, further comprising:
an operation determination means for determining whether a predetermined period of time has lapsed since an end of an operation previously carried out on any of the operation switches when an operation is carried out this time on a particular one of the operation switches; and
a second transmission control means for letting switch information indicating the type of the particular operation switch operated this time, operation duration information representing the duration of a continuous operation carried out on the particular operation switch and previous switch information transmitted in the operation previously carried out on any of the operation switches or switch information included in the previous operation information be transmitted as the operation information from the transmitting apparatus till an end of the operation carried out this time on the particular operation switch after the operation determination means determines that the predetermined period of time has not lapsed since an end of the operation previously carried out on any of the operation switches,
wherein the first transmission control means is constructed to let switch information indicating the type of the particular operation switch operated this time and operation duration information representing the duration of a continuous operation carried out on the particular operation switch be transmitted as the operation information from the transmitting apparatus if the operation determination means determines that the predetermined period of time has lapsed since the end of the operation previously carried out on any of the operation switches.

10. A receiving apparatus mounted on a vehicle as an apparatus used in a remote control of the vehicle, the receiving apparatus comprising:

a reception means for carrying out an operation to receive operation information transmitted by a transmitting apparatus for remotely controlling components employed in the vehicle;

an output means for outputting operation information received by the reception means to a control apparatus employed in the vehicle as a command for use in the remote control of the vehicle;

a reception determination means for determining whether a predetermined period of time has lapsed since an end of a previous operation carried out by the reception means to receive operation information after a current operation carried out by the reception means to receive operation information is started;

a first output control means for controlling the output means to output operation information received by the reception means in the current operation as the command till an end of the current operation after the reception determination determines that the predetermined period of time has lapsed since the end of the previous operation; and a second output control means for controlling the output means to output operation information received by the reception means in the current operation and operation information received by the reception means in the previous operation as the command till an end of the current operation after the reception determination determines that the predetermined period of time has not lapsed since the end of the previous operation.

11. A receiving apparatus mounted on a vehicle as an apparatus used in a remote control of the vehicle, the receiving apparatus comprising:

a reception means for carrying out an operation to receive operation information transmitted by a transmitting apparatus for remotely controlling components employed in the vehicle;

an output means for outputting operation information received by the reception means to a control apparatus employed in the vehicle as a command for use in the remote control of the vehicle; and a first output control means for controlling the output means to output operation information received by the reception means in a reception operation and reception duration information representing a reception duration of operation information in a period of the reception operation as the command till an end of the reception operation after the reception operation is started.

12. A receiving apparatus as in claim 11, further comprising:

a reception determination means for determining whether a predetermined period of time has lapsed since an end of a previous operation carried out by the reception means to receive operation information after a current operation carried out by the reception means to receive operation information is started; and a second output control means for controlling the output means to output operation information received by the reception means in the current operation, reception duration information representing a reception duration of operation information in a period of the current operation and operation information received by the reception means in the previous operation as the command till an end of the current operation after the reception determination determines that the predetermined period of time has not lapsed since the end of the previous operation, wherein the first output control means is constructed to control the output means to output operation information received in the current operation and the reception duration information as the command if the reception determination determines that the predetermined period of time has lapsed since the end of the previous operation.

* * * * *